(12) United States Patent
Vanlandschoot et al.

(10) Patent No.: US 9,464,156 B2
(45) Date of Patent: Oct. 11, 2016

(54) METHOD FOR PRODUCING A SKIN LAYER OF A FLEXIBLE, ELASTOMERIC, THERMOSET, PHASE-SEPARATED POLYURETHANE MATERIAL

(75) Inventors: Koen Vanlandschoot, Wetteren (BE); Jurgen Mispelon, Beerst (BE); Bart Haelterman, Bever (BE); Geert Snellings, Sint-Lievens-Houtem (BE)

(73) Assignee: RECTICEL AUTOMOBILSYSTEME GMBH, Rheinbreitbach (DE)

( * ) Notice: Subject to any disclaimer, the term of this patent is extended or adjusted under 35 U.S.C. 154(b) by 443 days.

(21) Appl. No.: 13/581,723

(22) PCT Filed: Mar. 4, 2011

(86) PCT No.: PCT/EP2011/053340
§ 371 (c)(1),
(2), (4) Date: Oct. 23, 2012

(87) PCT Pub. No.: WO2011/107605
PCT Pub. Date: Sep. 9, 2011

(65) Prior Publication Data
US 2013/0035466 A1    Feb. 7, 2013

(30) Foreign Application Priority Data
Mar. 5, 2010  (EP) .................................. 10002295

(51) Int. Cl.
| C08G 18/28 | (2006.01) |
| C08G 18/32 | (2006.01) |
| C08G 18/75 | (2006.01) |
| C08G 18/79 | (2006.01) |
| C08G 18/18 | (2006.01) |
| C08G 18/48 | (2006.01) |
| C08G 18/66 | (2006.01) |

(52) U.S. Cl.
CPC ......... *C08G 18/283* (2013.01); *C08G 18/1825* (2013.01); *C08G 18/2835* (2013.01); *C08G 18/3203* (2013.01); *C08G 18/3206* (2013.01); *C08G 18/329* (2013.01); *C08G 18/3271* (2013.01); *C08G 18/3275* (2013.01); *C08G 18/3287* (2013.01); *C08G 18/4808* (2013.01); *C08G 18/4837* (2013.01); *C08G 18/4891* (2013.01); *C08G 18/6688* (2013.01); *C08G 18/755* (2013.01); *C08G 18/792* (2013.01)

(58) Field of Classification Search
CPC ............ C08G 18/283; C08G 18/2835; C08G 18/329; C08G 18/792; C08G 18/3287; C08G 18/3203; C08G 18/3275; C08G 18/755; C08G 18/3206; C08G 18/3271
USPC .......................................................... 528/49
See application file for complete search history.

(56) References Cited

U.S. PATENT DOCUMENTS 4,292,411 A    9/1981  Jourquin et al.

FOREIGN PATENT DOCUMENTS

| EP | 0 379 246 A2 | 7/1990 |
| WO | 98/14492 A1 | 4/1998 |
| WO | 2007/137623 A1 | 12/2007 |
| WO | WO 2010/008675 A1 * | 1/2010 |

OTHER PUBLICATIONS

International Search Report of PCT/EP2011/053340 dated Jun. 7, 2011.

\* cited by examiner

*Primary Examiner* — Rabon Sergent
(74) *Attorney, Agent, or Firm* — Sughrue Mion, PLLC

(57) ABSTRACT

The thermoset, phase-separated polyurethane material of the flexible skin layer is produced from a reactive mixture which is made of one or more isocyanate compounds and isocyanate reactive compounds which include one or more polyol compounds, flexibilizers, chain extenders and/or crosslinkers and amine-initiators. Apart from at least one cross-linking amine-initiator, these amine-initiators further include at least one extender amine-initiator.

12 Claims, 1 Drawing Sheet

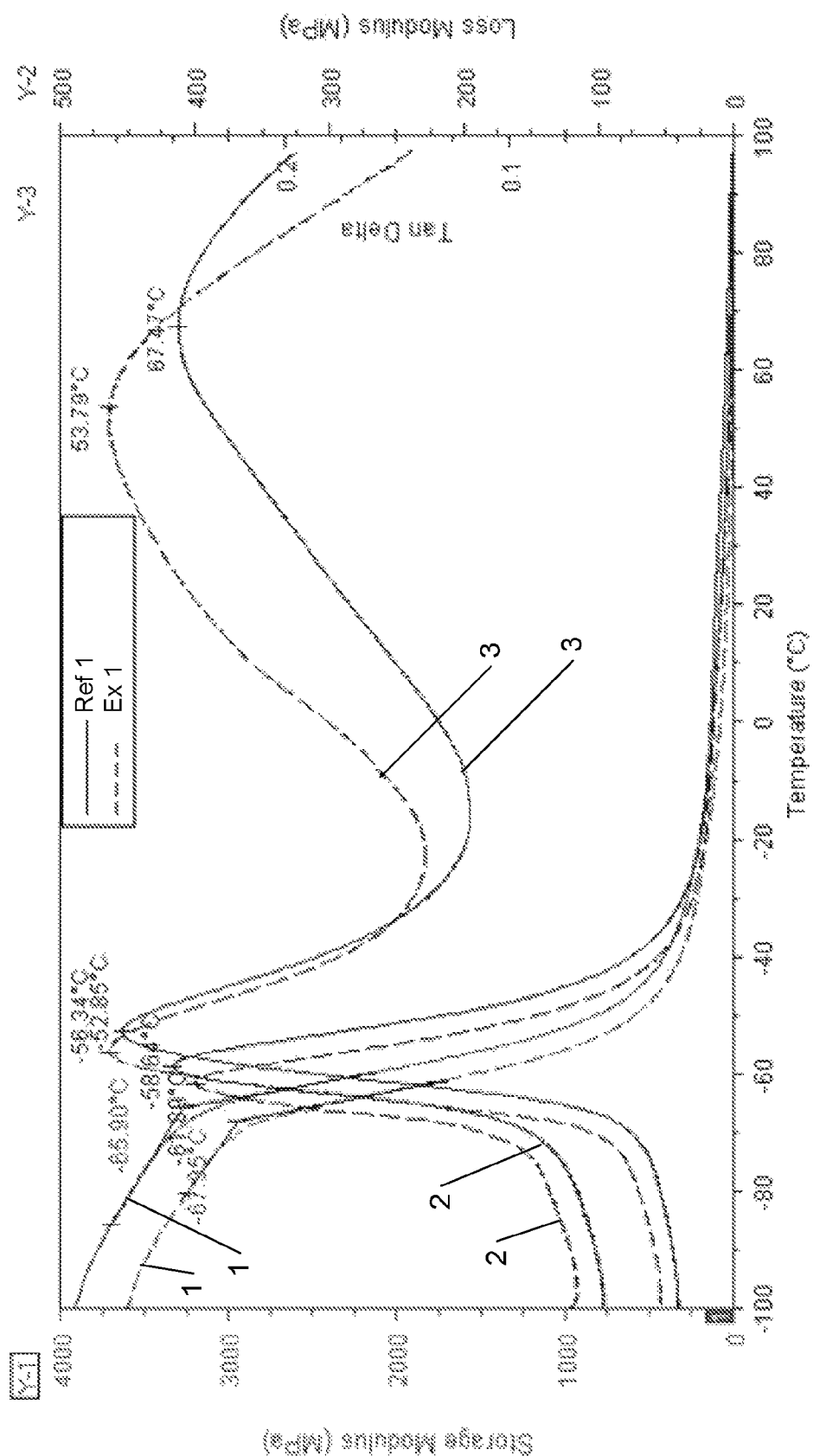

METHOD FOR PRODUCING A SKIN LAYER OF A FLEXIBLE, ELASTOMERIC, THERMOSET, PHASE-SEPARATED POLYURETHANE MATERIAL

CROSS REFERENCE TO RELATED APPLICATIONS

This application is a National Stage of International Application No. PCT/EP2011/053340 filed Mar. 4, 2011, claiming priority based on European Patent Application No. 10002295.3, filed Mar. 5, 2010, the contents of all of which are incorporated herein by reference in their entirety.

The present invention relates to a method for producing a skin layer of a flexible, elastomeric, thermoset, phase-separated polyurethane material which has an average density higher than 400 kg/m$^3$, in particular higher than 600 kg/m$^3$.

The polyurethane material of the skin layer is prepared by reacting a reactive mixture which is made of compounds comprising:

A) one or more isocyanate compounds having at least two NCO-groups which are not directly attached to an aromatic group;
B) isocyanate-reactive compounds comprising:
  b1) one or more active hydrogen containing compounds having:
    functional groups comprising hydroxyl, amine and/or thiol groups; a nominal functionality of from 2 to 8, preferably of from 2 to 4; and
    an equivalent weight of between 200 and 4000, preferably of between 800 and 2000;
  b2) one or more active hydrogen containing flexibilisers which reduce the flexural modulus of the polyurethane material, which have a molecular weight between 76 and 5000 and which contain only one isocyanate-reactive group which will react with an isocyanate group of said isocyanate compounds;
  b3) 1 to 30 parts by weight, per 100 parts by weight of said isocyanate-reactive compounds B, of one or more chain-extenders and/or crosslinkers having only hydroxyl groups as functional groups, at least 50% of which are primary hydroxyl groups, an equivalent weight smaller than 200 and a functionality from 2 to 6; and
  b4) one or more amine-initiators which form a co-catalytic system with catalyst component C, which have a functionality of 2 to 6 and an equivalent weight lower or equal to 200 and which comprise at least one aliphatic or alicyclic NH$_2$— or NH— group, the amine-initiators (b4) comprising one or more crosslinking amine-initiators which have a functionality of at least 3; and
C) one or more catalysts.

The polyurethanes produced from such a reactive composition are segmented polymers containing "soft" segments, based on the flexible polyol chains, and "hard" segments, based on urethane groups formed by the isocyanates and the low molecular weight chain extenders and crosslinkers. Because there is a degree of thermodynamic immiscibility between the hard urethane-based segments and the soft polyol chain based segments, polyurethane elastomers exhibit micro phase separation, which could result in a structure that can be considered as hard segment domains dispersed in a soft segment matrix. Usually, micro phase separation is incomplete and the hard and soft segment phases still contain amounts of the other segment. This is especially true for the polyurethane elastomers produced from the above described reactive composition which are crosslinked to some degree. Due to this crosslinking, they have no melting temperature, in contrast to linear, thermoplastic polyurethanes which comprise crystalline hard segment domains melting at a temperature of for example 150° C. or higher. As a result hereof, the crosslinked (thermoset) polyurethane skin layer has to be moulded to the required shape before the reactive mixture is cured and it is not possible to re-melt and reshape the polyurethane elastomer material, once it is cured, as it is the case for thermoplastic materials.

Elastomeric, thermoset polyurethane skins are in particular used in interior trim parts of automotive vehicles, more particularly in instrument panels, door panels, consoles, glove compartment covers, etc. In such applications the polyurethane skin is adhered to a rigid substrate either directly or by means of an intermediate semi-rigid backfoam layer, which is situated between the elastomeric skin and the substrate.

The polyurethane skin layer can be made by spraying, injecting or pouring the reactive mixture. Suitable polyurethane reaction mixtures for spraying flexible elastomeric polyurethane skin layers are disclosed for example in EP-B-0 379 246. These compositions are based on aliphatic isocyanates and result in light-stable polyurethanes which do not require an in-mould coating (or a post-painting step) to avoid discoloration of the skin. The Colo-Fast® aliphatic polyurethane formulations which are produced according to the teachings of this patent, enable to achieve flexible polyurethane skin layers having a flexural modulus, measured in accordance with ASTM D790-03, of between 20 and 30 MPa.

A problem with these aliphatic polyurethane formulations is that the organolead catalysts which are used therein are or will be forbidden in the future because of environmental regulations. Alternative formulations are now available wherein the organolead catalyst is replaced for example by an organobismuth catalyst, either or not combined with an organotin catalyst or an organozinc catalyst (see for example WO 2004/000905). A drawback of the lead free polyurethane formulations is that they result in stiffer polyurethane skins having a flexural modulus of about 40 MPa or even higher. The presently available tin free polyurethane formulations enable to achieve a somewhat lower flexural modulus but they require considerably longer curing times.

In order to lower the flexural modulus of the polyurethane skin, WO 2007/137623 discloses to add a flexibiliser to the polyurethane reaction mixture. However, this has some negative effects on the mechanical properties of the skin layer such as on the tensile strength and the tear resistance.

A problem with thermoset polyurethane skins is also that trim parts comprising such skins are usually produced in accordance with a two step process. In a first step, the polyurethane skins are produced against a first mould surface. In a second step, the skin is demoulded and united with a rigid substrate layer. A problem when removing the polyurethane skin from the first mould is that creases may be formed in the skin, especially when the skin is relatively stiff and/or when the mould has undercuts so that the skin has to be folded considerably in order to enable to demould it. Such creases may be formed in the skin layer, not only when demoulding it, but also when transporting and/or storing it before being united with the substrate layer. These creases are highly undesirable because they may lead to visual defects which are still visible in the final trim part. In order to avoid the formation of creases in the skins, special precautions need to be taken with respect to the handling, the storage and the transportation, which add a higher cost in the whole production process of the trim part. The formation of creases could be decreased by adapting the chemical formulation, for instance by increasing the flexibility of the skin such as by adding a larger amount of flexibiliser or by reducing the amount of crosslinker. However, enhancing the flexibility of the skin in this way, reduces significantly the mechanical properties of the skin, such as the tear and tensile strength.

An object of the present invention is therefore to provide a new method which enables to produce flexible skin layers which are flexible enough to avoid creases in the skin during manufacture and further handling, substantially without negatively affecting their other mechanical properties, so that visual defects are avoided in the final parts wherein the skin layers are united with a backing substrate layer, whilst still maintaining the other required mechanical properties of the skin at a satisfactory level.

To this end, the method according to the invention is characterised in that said amine-initiators (b4) comprise one or more extender amine-initiators, which have a functionality of 2 and a molecular weight of less than 300 and which correspond to formula (I):

$$HR^1N-R^2-OH \qquad (I)$$

wherein:
R$^1$ is H or a cyclic or acyclic hydrocarbon chain, which is substituted or not and which comprises one or more hetero-atoms or not, R$^1$ being preferably H or a C1 to C6 alkyl group; and
R$^2$ is a cyclic or acyclic hydrocarbon chain which is substituted or not, which comprises one or more hetero-atoms, such as an O, S or N-atom, or not and which comprises a backbone linking the amino group with the hydroxyl group and containing at least two carbon atoms, and in that the ratio between the amount of said extender amine-initiators and the amount of said crosslinking amine-initiators is such that the polyurethane material has a softening temperature which is lower than 65° C., preferably lower than 60° C. and more preferably lower than 55° C.

In the present specification the softening temperature $T_s$ is defined as the temperature at which the tan delta of the polyurethane material, determined by a dynamic mechanical analysis as a function of the temperature, shows a peak value in the temperature range between −10° C. and 75° C.

Dynamic mechanical analysis (DMA) detects transitions associated with movement of polymer chains. The technique involves measuring tic resonant frequency and mechanical dampening of a material forced to flex at a selected amplitude. Mechanical dampening is the amount of energy dissipated by the sample as it oscillates, while the resonant frequency defines Young's modulus of stiffness. Loss modulus (E") and the ratio of loss modulus (E") to elastic (storage) modulus (E'), i.e. the tan delta, can be calculated from the raw frequency and damping data.

A polyurethane elastomer material has a first major tan delta peak at a relatively low temperature (−40° C. to −80° C.), corresponding to the glass transition temperature $T_g$. The crosslinked polyurethane elastomer material has a second major tan delta peak at a higher temperature, the top or peak value thereof being situated for the polyurethane material obtained by the method according to the invention between −10 and 75° C. According to the invention it has been found that, although the polyurethane elastomer is not thermoplastic and can thus not be molten, some further important mobility of the polymer chains is apparently obtained at this second tan delta peak. It has indeed been found that creases in the polyurethane skin disappear by heating the skin to a temperature which is in the range of said second major tan delta peak, and which may be lower than the temperature corresponding to the tan delta peak value, either or not by also exerting some additional pressure on the heated skin. In the present specification, the temperature corresponding to the maximum value of this second tan delta peak is called the "softening temperature" $T_s$ of the polyurethane material.

In the method according to the present invention, the softening temperature $T_s$ of the produced polyurethane material can be lowered to below 65° C., preferably below 60° C., by the use of an extender amine-initiator of formula (I) without having significant negative effects on the mechanical properties of the obtained elastomer. In general, when replacing a portion of the crosslinking amine initiator by the extender amine initiator, i.e. when increasing the ratio of the amount of extender amine-initiator to the amount of crosslinking amine-initiator, $T_s$ will decrease and vice versa.

According to the invention, it has been found surprisingly that the $T_s$ decreasing effect of the extender amine-initiator is higher when a flexibiliser is added. Moreover, synergetic effects on the decrease of the $T_s$ value as well as on the flexural modulus have been observed when using the flexibiliser in combination with the extender amine-initiator of formula (I). The combined effect of the flexibiliser and the extender amine-initiator on the softening temperature $T_s$ and on the flexural modulus of the polyurethane material has been found to be larger than the sum of their individual effects so that a smaller amount of these two compounds can be used and hence the undesired effects on the mechanical properties of the polyurethane elastomer can be kept to a minimum.

In a preferred embodiment of the method according to the invention, the functionality of said isocyanate compounds and of said isocyanate-reactive compounds and the relative amounts thereof are selected so that the average molecular weight per crosslink ($M_c$) of the produced polyurethane material is less than 4000, preferably less than 3000 and more preferably less than 2000, but larger than 700 and preferably larger than 900.

This degree of crosslinking of the polyurethane material provides for certain improved mechanical properties such as tear resistance, tensile strength, heat resistance and resistance against thermal deformations. Notwithstanding this relatively high degree of crosslinking, the method according to the present invention enables to achieve a sufficiently low softening temperature $T_s$ and to soften the polyurethane material to such an extent that creases which may have been formed in the produced polyurethane skin layer during manufacture or further handling can be removed therefrom. Moreover, the combination of the flexibiliser and extender amine-initiator used in the method according to the present invention enables to reduce the flexural modulus of the crosslinked polyurethane material, and enables thus to reduce the risk on crease formation, while substantially maintaining the desired mechanical properties thereof.

In a further preferred embodiment of the method according to the present invention, the polyurethane skin layer is produced on a mould surface, is removed therefrom and is being deformed upon or after removing it from the mould surface, after having been deformed the produced polyurethane skin layer is heated to a temperature which is higher than $T_s$ minus 30° C., preferably higher than $T_s$ minus 20° C. and more preferably higher than $T_s$ minus 10° C. so that creases which may have been formed in the skin layer during its deformation, are at least partially removed.

The present invention also relates to a skin layer obtained by the method according to the invention. This skin layer is made of a flexible, elastomeric, thermoset, phase-separated polyurethane material which has preferably a flexural modulus, measured in accordance with ASTM D790-03, smaller than 40 MPa, preferably smaller than 35 MPa, and an average density higher than 400 kg/m$^3$, in particular higher than 600 kg/m$^3$. The skin layer is characterised in that the polyurethane material of this skin layer has a softening temperature which is lower than 65° C., preferably lower than 60° C. and which is preferably higher than −10° C., more preferably higher than 0° C.

The present invention finally also relates to the use of a skin layer according to the invention for manufacturing a self-supporting part containing the skin layer united with a rigid substrate layer. This use is characterised in that before and/or after having united the skin layer with the rigid substrate layer it is heated to a temperature which is higher than the softening temperature minus 30° C., preferably higher than the softening temperature minus 20° C. and more preferably higher than the softening temperature minus 10° C. so that creases which may have been formed in the skin layer are at least partially removed.

Other particularities and advantages of the invention will become apparent from the following description of some particular embodiments of the method, the skin layer and the use thereof according to the present invention. Reference is made therein to the annexed drawings.

BRIEF DESCRIPTION OF THE DRAWING

The single drawing is a FIGURE that is a graphical representation of the tan delta-temperature relationship, the storage modulus-temperature relationship and the loss modulus-temperature relationship for a polyurethane skin material made according to the invention and a reference polyurethane skin material.

The invention relates to a method for producing a skin layer of a flexible, elastomeric, thermoset, phase-separated polyurethane material which has an average density higher than 400 kg/m$^3$, in particular higher than 600 kg/m$^3$. The skin layer has preferably an average thickness (=total volume divided by surface area) which is larger than 0.1 mm, and preferably larger than 0.2 mm, but smaller than 5 mm, preferably smaller than 3 mm and more preferably smaller than 2 mm. The polyurethane material of the skin layer has preferably a flexural modulus, measured in accordance with ASTM D790-03, smaller than 40 MPa and preferably smaller than 35 MPa and more preferably smaller than 30 MPa.

The polyurethane material of the skin layer is prepared by reacting a reactive mixture of polyurethane precursors. To produce the skin layer, the reactive mixture can be applied by spraying or pouring it onto a mould surface or it can be injected in a closed mould in accordance with a RIM process (Reaction Injection Moulding). Spraying of the reactive mixture is preferred and can be done by means of the techniques and spray nozzles disclosed in EP-B-0 303 305, EP-B-0 389 014, EP-B-1 638 696 and WO 2008/148419.

In the method according to the present invention, the reactive mixture is made of compounds comprising:
A) one or more isocyanate compounds having at least two NCO-groups which are not directly attached to an aromatic group;
B) isocyanate-reactive compounds comprising:
b1) one or more active hydrogen containing compounds having:
functional groups comprising hydroxyl, amine and/or thiol groups; a nominal functionality of from 2 to 8, preferably of from 2 to 4; and
an equivalent weight of between 200 and 4000, preferably of between 800 and 2000;
b2) one or more flexibilisers which reduce the flexural modulus of the polyurethane material, which have a molecular weight between 76 and 5000 and which contain only one isocyanate-reactive group which will react with an isocyanate group of said isocyanate compounds;
b3) 1 to 30 parts by weight, per 100 parts by weight of said isocyanate-reactive compounds B, of one or more chain-extenders and/or crosslinkers having only hydroxyl groups as functional groups, at least 50% of which are primary hydroxyl groups, an equivalent weight smaller than 200 and a functionality from 2 to 6; and
b4) one or more amine-initiators which form a co-catalytic system with catalyst component C, which have a functionality of 2 to 6 and an equivalent weight lower or equal to 200 and which comprise at least one aliphatic or alicyclic NH$_2$— or NH— group; and
C) one or more catalysts comprising in particular at least one organometal catalyst and/or at least one amine catalyst.

These compounds can be applied either by a so-called "one-shot" process, a prepolymer process or a semi-prepolymer process, which are processes well-known to the skilled person.

Usually, 100 parts by weight of the isocyanate-reactive compounds (B) comprise:
70 to 95 parts by weight, preferably 80 to 92 parts by weight of said active hydrogen containing compounds (b1);
at least 1, preferably at least 2 and more preferably at least 3, but less than 20, preferably less than 15 parts by weight of said flexibilisers (b2);
1 to 30 parts by weight, preferably 1 to 15 parts by weight, of said chain extenders and/or crosslinkers; and
1 to 30 parts by weight of said amine-initiators.

An essential feature of the method according to the invention is that the amine-initiators (b4) comprise:
1) an amount of one or more crosslinking amine-initiators which have a functionality of at least 3; and
2) a further amount of one or more extender amine-initiators, which have a functionality of 2 and a molecular weight of less than 300 and which correspond to formula (I):

$$HR^1N-R^2-OH \qquad (I)$$

wherein:
R$^1$ is H or a cyclic or acyclic hydrocarbon chain, which is substituted or not and which comprises one or more hetero-atoms or not, R$^1$ being preferably H or a C1 to C6 alkyl group; and
R$^2$ is a cyclic or acyclic hydrocarbon chain which is substituted or not, which comprises one or more hetero-atoms, such as an O, S or N-atom, or not and which comprises a backbone linking the amino group with the hydroxyl group and containing at least two carbon atoms.

In formula (I) of the extender amine-initiator, R$^1$ is preferably hydrogen but may also be a C1 to C6 alkyl group, or more generally a cyclic or acyclic hydrocarbon chain, which is substituted or not and which comprises one or more hetero-atoms, such as an O, S or N— atom, or not. This organic group may comprise for example an ethylene oxide and/or propylene oxide adduct.

In the present specification, a primary amine group $NH_2$ is considered as one functional group since after reaction with an isocyanate group, the resulting urea group is considerably less reactive towards a further isocyanate group.

Polyurethane elastomers produced from the above described reactive mixture are segmented polymers, which consist of soft segments and hard segments. The soft segments are formed by the high molecular weight (MW) polyol, and provide the polyurethane elastomer with the required flexibility and elasticity. The hard segments are formed by the reaction between the low MW isocyanate reactive compounds (b3) and (b4) containing hydroxyl and/or amine groups, and the isocyanate compounds, resulting in urethane and/or urea bonds. These high polar urethane or urea groups provide physical crosslinks by hydrogen bonding with hard segments of neighbouring molecules, whereby a strong molecular association between the hard segments of different polymer chains is formed. In the polyurethane elastomer materials produced in the method according to the present invention, the polymer chains are further chemically crosslinked by the used crosslinking amine-initiators and the optional crosslinkers with only hydroxyl functional groups (both having a functionality of 3 or higher) so that, in contrast to thermoplastic polyurethanes, crosslinked polyurethanes do not melt.

In the method according to the invention, the functionality of said isocyanate compounds (A) and of said isocyanate-reactive compounds (B) and the relative amounts of these isocyanate and isocyanate-reactive compounds are selected so that the average molecular weight per crosslink ($M_c$) of the produced polyurethane material is preferably less than 4000, more preferably less than 3000 and most preferably less than 2000, but larger than 700 and preferably larger than 900. The polyurethane elastomer material is thus clearly a thermoset material formed by covalently crosslinked network structures which, once cured, do not dissolve or flow without the breaking of covalent bonds.

The average molecular weight per crosslink ($M_c$) is calculated by the following equation:

$$M_c = \frac{\text{Polymer weight}}{\sum (F_n \text{real} - 2) \times \text{number of moles reacting}}$$

wherein, "$F_n$ real" refers to the number average functionality of, or the sum of the reactive equivalents divided by the sum of the moles, for each of the reactive materials in the polymer formulation.

At low temperatures, the glass transition temperature ($T_g$) of the soft segment domains or phases influences the mechanical properties of the polymer. At higher temperatures, either the glass transition temperature or the melting point ($T_m$: only for thermoplastic elastomers) of the hard segment phases determines the point at which physical crosslinks dissociate. Since in the crosslinked, thermoset polyurethane material produced in the method according to the present invention the hard segment phases do not melt upon dissociation of the physical crosslinks (since the chemical crosslinks still remain), this is referred to in the present specification as the softening of the hard segments. The extent of chemical crosslinks, or in other words the average molecular weight per crosslink, will further determine the properties above this softening temperature ($T_s$).

As a consequence, variation in chain extenders/crosslinkers is a way to influence the thermal properties of polyurethane elastomers.

The thermal behaviour (elasticity in function of temperature) is thus related to phase separation between hard and soft segments, as well as by the ratio between the amounts of these segments. Dynamic Mechanical Analysis (DMA) is a well-known test method to determine the thermal behaviour.

The basic properties obtained from a DMA test include storage modulus (E'), loss modulus (E") and tan delta (tan δ), which is the ratio of loss modulus to storage modulus (E"/E'). This ratio is particularly important for elastomers because it's related to the material's ability to dissipate energy in the form of heat. With this technique, glass transition temperature ($T_g$) of the soft segment phases and softening point ($T_s$) of the hard segment phases can be determined. The tan delta and loss and storage moduli specified in the present specification are all measured versus temperature by the test method further explained under Examples. The temperatures corresponding to the peak values of the two major peaks of the tan delta curve are taken as the glass transition temperature ($T_g$) and respectively as the softening temperature ($T_s$) of the specimen tested.

In the method according to the present invention, the ratio between the amount of said extender amine-initiators and the amount of said crosslinking amine-initiators is such that softening temperature is lower than 65° C. and preferably lower than 60° C. The softening temperature may in particular be lower than 55° C. and more particularly even lower than 50° C. This softening temperature is normally higher than −10° C., and in particular higher than 0° C., and is defined as the tan delta peak value of the polyurethane material, determined by a dynamical mechanical analysis (DMA) as a function of the temperature (at a frequency of 1 Hz, a ramp rate of 3° C. min$^{-1}$ and an amplitude of 15 μm).

The first advantage of a reduced softening temperature $T_s$, i.e. a softening temperature which is lower than 65° C., and preferably lower than 60° C., is that creases are not or less formed, and when creases are still formed in the skin layer upon demoulding or handling of the skin, these can be removed or considerably reduced by subjecting the skin to a temperature which is higher than $T_s$ minus 30° C., preferably higher than $T_s$ minus 20° C. and more preferably higher than $T_s$ minus 10° C. Subjecting the skin layer to such a temperature can be done on the mould on which the skin has been formed or on the mould used to unite the skin layer with a premanufactured substrate layer by means of an adhesive or preferably by means of an intermediate foam backing layer. During this foaming process, a pressure is exerted onto the skin layer so that it rests or is even urged against the heated mould surface. Alternatively, the substrate layer can also be moulded against the back of the skin layer, for example as disclosed in EP-B-1 126 958 or in EP-B-0 642 411. Also in this case the skin layer is urged with some pressure against the mould surface, the skin layer may be heated by heating the mould surface and/or by applying a heated substrate material against the skin layer. Before uniting the substrate layer with the skin layer, a backing layer, which may be a foam layer or a further elastomeric layer, can be moulded against the back of the skin layer, for example as disclosed in EP-A-2 024 413, which is incorporated herein by way of reference, especially as to the description of the further foam layer or elastomeric layer and the properties and the ways of applying it onto the back of the skin layer.

In another embodiment, the skin layer can be united with the rigid substrate layer by positioning it directly onto this substrate layer, i.e. without positioning the skin layer first onto a mould surface, so that it rests on the substrate layer with an adhesive being applied between the skin layer and the substrate layer. In this embodiment the skin layer is heated before and/or during and/or after being positioned onto the substrate layer to a temperature higher than $T_s$ minus 30° C., preferably higher than $T_s$ minus 20° C. and more preferably higher than $T_s$ minus 10° C., but lower than a temperature which is 40° C., preferably 20° C., higher than $T_s$. The skin layer is urged with some pressure against the surface of the substrate layer when applying the skin layer onto the substrate layer and/or when it is held (optionally in a somewhat stretched state) against the substrate layer by means of the adhesive.

A second advantage of a softening temperature $T_s$ being reduced to lower than 65° C., and preferably lower than 60° C., is that this has been found to correlate with a reduced flexural modulus (increased flexibility) and with an improved haptic or tactile feeling of the skin layer.

A reduction of the flexural modulus is especially required when replacing the lead catalyst in reactive PU formulations by a lead-free organometallic catalyst. PU formulations containing a Pb oganometallic catalyst, are known to produce very flexible skins. The same holds true when replacing conventional petroleum-based active hydrogen containing compounds at least partially by a polyol derived from a renewable source, in particular from a natural oil.

As the consumer demand for "greener" or "bio-based" products continues to grow, several attempts have been made to replace part of the petroleum based polyols by "bio-based" or "greener" polyols. As a result, it would be most advantageous to replace the petroleum based polyols, as used in the production of urethane elastomers and foams, with more versatile, renewable and more environmentally friendly polyols, hereinafter called NOP (Natural Oil Polyols). The term 'natural oil polyol' or 'natural oil derived polyol' is used herein to refer to compounds having isocyanate reactive groups (hydroxyl and/or amine and/or thiol groups) that are isolated from, derived from/based on or manufactured from renewable resources such as natural oils, including animal and/or vegetable oils and/or algea, preferably vegetable oils. Examples of vegetable and animal oils (natural and/or genetically modified) that may be used include, but are not limited to, soybean oil, castor oil, safflower oil, linseed oil, corn oil, sunflower oil, olive oil, canola oil, sesame oil, cottonseed oil, palm oil, cashew nut oil, rapeseed oil, tung oil, fish oil, or a blend of any of these oils. The isocyanate reactive groups can be introduced by air or oxygen to various organic compounds. Often, unsaturation in the natural oil or isolates therefrom is converted to hydroxyls or to a group which can be subsequently be reacted with a compound that has isocyanate reactive groups such that a NOP is obtained. When using NOP of high renewable content, the mechanical properties are usually negatively affected. With increasing concentration of NOP the flexural modulus is increasing (elongation is decreasing). This tendency is even more pronounced when the material undergoes a typical dry heat ageing of 500 h at 120° C. This stiffening phenomenon is limiting the use of higher concentrations of NOPs for skin layers because of its negative influence on touch and packaging issues and so limiting the increase of the renewable content. A possible way to improve properties is to use a combination of NOPs. Such an approach can be used to make up a larger proportion of a NOP than can one of the individual renewable source polyols of the combination when used alone or such a combination results in more desirable physical properties of a higher level of renewable content in a resulting polyurethane elastomer than does any component of the combination alone. Such combination of different natural oil polyols exhibits satisfactory properties at higher levels of renewable resources. Properties and/or processing are improved compared to essentially the same end product manufactured using one of the natural oil polyols alone in amount equal to that of the combination (see WO 2009/020774 A1 which is included herein by way of reference). Still at higher levels of renewable resources the aforementioned stiffening phenomenon is appearing so that the increased flexibility which can be obtained by the method according to the present invention is advantageously applied to the production of polyurethane skin layers wherein one or more NOPs are used.

In the present specification a polyol derived from a renewable source is in particular defined as a polyol having a total renewable carbon to total carbon, obtained by an ASTM D6866 analysis, of at least 5%, preferably of at least 10% and more preferably of at least 20%.

In the method according to the present invention, the softening temperature $T_s$, and thus also the flexural modulus, is controlled by varying the ratio between the amount of said extender amine-initiators and the amount of said crosslinking amine-initiators so that the softening temperature $T_s$ is lower than 65° C. The use of the extender amine initiators of formula (I) was found to enable to increase the ratio of extender amine-initiators to crosslinking amine-initiators to reduce the softening temperature, and the flexural modulus, without, or with a minimum effect on the mechanical properties such as the tear resistance and tensile strength of the skin layer.

The extender amine-initiator or initiators preferably comprise an α,ω-aminohydroxy(alkylene oxide)$_n$, n being from 2 to 7, in particular diglycolamine (DGA) and/or triglycolamine, and/or an aminoalcohol, in particular 2-aminoethanol, 3-amino-2-propanol (IPA), 3-amino-1-propanol (3-APROP), 2-amino-1-propanol, 4-amino-1-butanol, 5-amino-1-pentanol (5-APENT), 6-amino-1-hexanol, 7-amino-1-heptanol, 2-amino-2-methyl-1-propanol (AMP), 2-amino-1-butanol (2-ABUT) and/or N-methyl-ethanolamine (MEA).

The isocyanate-reactive compounds B comprise, per 100 parts by weight thereof, preferably at least 0.5, more preferably at least 1, and most preferably at least 1.5 parts by weight of one or more of the extender amine-initiators of formula (I). The total amount of these one or more extender amine-initiators of formula (I) is preferably less than 20, more preferably less than 10 parts by weight, per 100 parts by weight of the isocyanate-reactive compounds B.

As described already hereabove, the isocyanate-reactive compound B also comprise crosslinking amine-initiators which have a functionality equal to or higher than 3, but less than or equal to 6. Examples of such crosslinking amine-initiators are diisopropanolamine, 3-amino-1,2-propanediol, 2-amino-2-methyl-1,3-propanediol, 2-amino-2-ethyl-1,3-propanediol and diethanol amine. The preferred crosslinking amine-initiator is diethanol amine (DEOA). The isocyanate-reactive compounds B comprise, per 100 parts by weight thereof, preferably at least 1, preferably at least 2, and more preferably at least 3 parts by weight of one or more crosslinking amine-initiators. The total amount of these one or more crosslinking amine-initiators is preferably less than 10, more preferably less than 8, and most preferably less than 6 parts by weight, per 100 parts by weight of the isocyanate-reactive compounds B.

In view of maintaining the desired mechanical properties (tear resistance and tensile strength e.g.) and of the desired reduced softening temperature $T_s$ of the polyurethane elastomer material, the amine-initiators (b4) have a number average functionality which is preferably larger than 2.0, more preferably larger than 2.1 whilst their number average functionality is preferably smaller than 3.0, more preferably smaller than 2.9.

The amine-initiators may also comprise one or more extender amine-initiators which are not of formula (I), such as for example ethylenediamine, isophoronediamine, N,N'-dimethyl-ethylenediamine and N,N'-diethyl-ethylenediamine. The isocyanate-reactive compounds are however preferably free of such extender amine-initiators or comprise, per 100 parts by weight, preferably less than 1 part by weight, more preferably less than 0.5 parts thereof.

As explained already hereabove, an essential feature of the method according to the present invention, is the use of one or more flexibilisers, in combination with the extender amine-initiator, in view of the synergetic effects which may be obtained by this combination on the lowering of the softening temperature $T_s$, and thus also on the reduction of the flexural modulus. The flexibiliser comprises at least one isocyanate-reactive group which ensures that the flexibiliser is covalently incorporated in the polyurethane network. The most suitable flexibilisers comprise only one isocyanate-reactive group. Other flexibilisers may however contain one or more further isocyanate-reactive groups, which do substantially not participate in the formation of the polyurethane network, for example due to steric hindrance.

The flexibiliser may comprise alkoxylated alcohols, in particular alkoxylated terpene alcohols as disclosed in U.S. Pat. No. 4,383,050, mono-amines such as octyl amine, stearylamine, N-methylstearylamine, pyrrolidine, piperidine or cyclohexylamine, and mono alcohols like 2-ethylhexanol, octanol, dodecanol, stearylalcohol, the various amyl alcohols, cyclohexanol, etc.

At least one of the used flexibilisers preferably contains a polyether chain comprising ethylene oxide, propylene oxide or tetramethylene oxide units, or a mixture of two or more of these units in a mixed, blocked or random sequence. The flexibiliser more preferably comprises preferably a monoalkylether of polyethylene glycol, polypropylene glycol or poly(tetramethylene ether) glycol.

The molecular weight of the flexibiliser is preferably comprised between 150 and 2000, and preferably between 200 and 1500. Preferably it has a tail portion, which is free of isocyanate-reactive groups and which has a moleculer weight of at least 75, preferably of at least 150 and more preferably of at least 200.

The flexibiliser can be added to the polyol blend. However, it can also be added to at least one polyisocyanate compound so that it will form therewith a reaction product comprising at least one free NCO groups, which assures that the flexibiliser is covalently built-in in the polyurethane network.

In addition to the amine-initiators and the flexibiliser, the reactive mixture further comprises the low molecular weight chain-extenders and/or crosslinkers (b3) which have only hydroxyl groups as functional groups, at least 50% of which are primary hydroxyl groups, an equivalent weight smaller than 200 and a functionality from 2 to 6. Typical preferred crosslinkers or chain extenders are ethylene glycol, propanediol, butanediol, pentanediol, hexanediol, glycerin, trimethylolpropane, triethanolamine, trimethylolethane, pentaerythritol, bisphenol A and cyclohexanedimethanol, and also possible addition products of all these examples with less than 5 or with 5 moles ethylene oxide and/or propylene oxide per mole chain extender/crosslinker.

Preferably, the chain-extenders and/or crosslinkers (b3) have a number average functionality which is equal to or larger than 2 and smaller than 2.5, and which is more preferably smaller than 2.3 and most preferably smaller than 2.1. The chain-extender/crosslinker component is therefore preferably substantially free of crosslinkers.

The isocyanate-reactive compounds further comprise the one or more active hydrogen containing compounds (b1) which have a larger molecular weight, more particularly an equivalent weight of between 200 and 4000 and a nominal functionality of from 2 to 8. These active hydrogen containing compounds are preferably polyether polyols with terminal OH-groups prepared by polyaddition of propylene oxide and/or ethylene oxide on low molecular weight initiators with OH—, NH— and/or $NH_2$— groups and having a functionality of 2 to 8. This functionality corresponds to the nominal functionality of the polyether polyol.

Instead of, or in addition to, the OH-groups, the active hydrogen containing compounds may also contain isocyanate-reactive NH— or $NH_2$— groups. Examples of such compounds are the so-called Jeffamines®.

Other types of active hydrogen containing compounds are the polyester polyols forming ester condensation products of dicarboxylic acids with low molecular weight polyalcohols having a functionality of 2 to 8, preferably of 2 to 4, corresponding to the nominal functionality of the polyester polyol.

Further suitable active hydrogen containing compounds are the polytetramethylene ether glycols (PTMG), which are polytetrahydrofuran with 100% primary OH-groups, and which have a nominal functionality of 2 and a hydroxyl number of 35 to 200.

Preferably, the active hydrogen containing compounds (b1) have a number average nominal functionality which is larger than 2.2, preferably larger than 2.5, but smaller than 6, preferably smaller than 4.

The compounds used for making or composing the reactive mixture also comprise one or more isocyanate compounds (A). An essential feature of the isocyanate compounds is that they comprise at least two NCO-groups which are not directly attached to an aromatic group. In this way the obtained polyurethane material can be made light-stable. The isocyanate component comprises preferably IPDI (isophoronediisocyanate) monomers or trimers or a mixture thereof, the IPDI monomer/trimer mixture having preferably an NCO content of between 24.5 and 34% by weight. Optionally, an isocyanate prepolymer, wherein a portion of the NCO-groups has already reacted with an active hydrogen containing compound, can also be used. Instead of IPDI other "non-aromatic" isocyanates can be used such as TMXDI, HDI, H6XDI and H12MDI or derivatives thereof. These isocyanates are described in EP-B-0 379 246, which description is incorporated herein by way of reference.

The composition can also contain appropriate additives, including, by way of example and without limitation, any combination of the following: heat and ultraviolet light stabilizers, pH stabilizers, antioxidants, dulling agents, surfactants, carbon black, thixotropic agents (e.g., amorphous silica), and fillers such as clay particles.

The catalyst or catalysts included in the reactive mixture may contain all the catalysts as disclosed in EP-B-0 379 246 but are preferably free of lead. These catalysts include organobismuth catalysts, organotin catalysts (including Sn(IV) carboxylates, dialkyldistannoxane dicarboxylates and alkyltinhalides) and the so-called alkaline catalysts (such as diazobicyclo-alkenes). Special organometal catalysts, including also organozinc catalysts, which can be used to reduce the emission of volatile organic compounds are further disclosed in WO 2004/000905. The description of these catalysts is also incorporated herein by reference.

In the method according to the invention use is preferably made of at least an organobismuth (III) catalyst, more particularly of bismuth octoate, bismuth neodecanoate, bismuth oleate, bismuth 12-hydroxy stearate or bismuth ricinoleate. Although it is also possible to use an organotin catalyst, the reactive mixture is preferably either substantially free of tin or contains less than 600, preferably less than 400 and more preferably less than 200 ppm of the element tin in view of reducing the amount of heavy metals in the polyurethane elastomer and/or the emission of volatile organic compounds.

The increased cure time, which may be due to the use of a tin free (or substantially tin free) catalyst system, can be obviated by producing an aromatic polyurethane skin layer against the back of the first skin layer, as disclosed in WO 2007/137623, herein incorporated by way of reference.

Aromatic polyisocyanates are very desirable for use in view of their higher reactivity compared to aliphatic polyisocyanates and in view of the better mechanical properties (e.g. tensile strength, elongation, and tear strength) of polyurethane elastomers obtained with these non-light-stable aromatic polyisocyanates.

EXAMPLES

The following raw materials have been used in the examples:
  polyol 1: Caradol ET 36-17 (Shell) which is an addition product of glycerine, propylene oxide and ethylene oxide having an equivalent weight of about 1600 and a primary OH content of about 85%;
  NOP 1: BiOH 5000 (Cargill) made mainly of soybean oil;
  NOP 2: Lupranol Balance 50 (BASF) which is an addition product of castor oil, propylene oxide and ethylene oxide;
  ISO: IPDI trimer dissolved in IPDI;
  PA-Bi: additives added to the polyol component comprising a mixture of antioxidantia, pigments, water scavenger, stabilizer and organobismuth catalyst;
  PA-Bi/A: additives added to the polyol component comprising a mixture of antioxidantia, pigments, water scavenger, stabilizer, organobismuth catalyst and amine catalyst;
  IA: additives added to the isocyanate component comprising a mixture of antioxidantia;
  IA-Sn: additives added to the isocyanate component comprising a mixture of antioxidantia and organotin catalyst;
  EG: ethyleneglycol;
  DEOA: diethanolamine;
  DGA: diglycolamine
  IPA: 3-amino-2-propanol;
  3-APROP: 3-amino-1-propanol;
  5-APENT: 5-amino-1-pentanol;
  AMP: 2-amino-2-methyl-1-propanol;
  2-ABUT: 2-amino-1-butanol;
  MEA: N-methyl-ethanolamine;
  P350, P500 and P750: methoxy-polyethyleneglycol having a molecular weight of about 350, 500 and 750 g/mol respectively.

The number average functionality of the amine-initiator combinations has been indicated in the tables by "$f_{ai}$"

General Handmix Procedure

The polyol component and the isocyanate component, which are stored at about 20° C., are added to each other and mixed for 8 to 10 seconds. The obtained mixture is poured onto a flat mould surface heated to a temperature of about 60-65° C. and previously provided with a mould release agent. The reactive mixture is distributed with a spatula in a thin layer having a substantially uniform thickness of 1-1.4 mm.

Test Methods

Density (kg/m$^3$): ISO 1183(02/2004)

Shore A: Shore A 3 sec according to DIN 53505 (08/2000)

Reactivity (s): fiber time

Elong(1) (%): Elongation according to ISO 37-1(07/2005)

Elong(1)HA (%): Elong(1) after dry heat aging at 120° C. for 500 hours

Elong(2) (%): Elongation according to DIN and ISO 527-3/2/100

Elong(2)HA (%): Elong(2) after dry heat aging at 120° C. for 500 hours

Tens(1) (N/mm$^2$): Tensile strength according to ISO 37-1 (07/2005)

Tens(1)HA (N/mm$^2$): Tens(1) after dry heat aging at 120° C. for 500 hours

Tens(2) (N/mm$^2$): Tensile strength according to DIN and ISO 527-3/2/100

Tens(2)HA (N/mm$^2$): Tens(2) after dry heat aging at 120° C. for 500 hours

Tear(1) (N/cm): Tear strength according to ISO 34-1-A(03/2004)

Tear(1)HA (N/cm): Tear(1) after dry heat aging at 120° C. for 500 hours

Tear(2) (N/mm): Tear strength according to ISO 34-1-B(b) (03/2004)

Tear(2)HA (N/mm): Tear(2) after dry heat aging at 120° C. for 500 hours

FlexMod (MPa): Flexural modulus according to ASTM D790 IB

FlexModHA (MPa): FlexMod after dry heat aging at 120° C. for 500 hours $T_g$ (° C.): Glass transition temperature measured by DMA analysis $T_s$ (° C.): Softening temperature measured by DMA analysis WaterAbs: water absorption according to RIM/T.015.5 (04/2008) expressed as % weight change.

The glass transition temperature $T_g$ and the softening temperature $T_s$ are determined by means of a DMA Q800 apparatus of TA Instruments. A rectangular piece of sample, having a thickness of about 1 mm, a width of about 2.6 mm and a length of about 15 mm, is subjected to an oscillatory deformation at a frequency of 1 Hertz and an amplitude of 15 μm. Data is collected over the temperature range of −100° C. to +100° C. with a temperature increment of 3° C./min. Before the sample is subjected to this oscillatory deformation, it is equilibrated for 10 minutes at −100° C. Graphs of loss modulus versus temperature, storage modulus versus temperature and tan delta versus temperature are obtained.

TABLE 1

Formulations of reference example 1, comparative examples 1-2 and examples 1-2, all with standard polyol and Bi/Sn catalysis.

|  | Ref 1 | Comp 1 | Comp 2 | Ex 1 | Ex 2 |
|---|---|---|---|---|---|
| Polyol blend | | | | | |
| Polyol 1 | 76 | 76 | 76 | 76 | 76 |
| NOP 1 | | | | | |
| NOP 2 | | | | | |
| DEOA | 6 | 5 | 6 | 5 | 5 |
| EG | 4 | 4 | 4 | 4 | 4 |
| DGA | | 1.5 | | 1.5 | |
| MEA | | | | | 1 |
| $f_{ai}$ | 3.0 | 2.77 | 3.0 | 2.77 | 2.83 |
| PA-Bi | 22.7 | 22.7 | 22.7 | 22.7 | 22.7 |
| Isocyanate blend | | | | | |
| ISO | 54.1 | 54.1 | 54.1 | 54.1 | 54.1 |
| P500 | | | 5 | 5 | 5 |
| IA-Sn | 1.2 | 1.2 | 1.2 | 1.2 | 1.2 |

The average molecular weight per crosslink Mc of the polyurethane material produced in Example 1 is equal to 1110.

TABLE 2

Properties of the skin layer obtained from the formulations Table 1.

|  | Ref 1 | Comp 1 | Comp 2 | Ex 1 | Ex 2 |
|---|---|---|---|---|---|
| Density | 1.00 | 1.02 | 1.00 | 1.02 | 1.00 |
| Shore A | 76 | 81 | 79 | 79 | 81 |
| Reactivity | 19 | 17 | 20 | 36 | 20 |
| Elong(1) | 88 | 88 | 105 | 122 | 106 |
| Elong(1)HA | 129 | 133 | 143 | 129 | 160 |
| Elong(2) | 118 | 153 | 151 | 176 | 129 |
| Elong(2)HA | 206 | 225 | 223 | 227 | 245 |
| Tens(1) | 6.6 | 5.9 | 5.7 | 5.9 | 5.9 |
| Tens(1)HA | 5.6 | 5.7 | 4.2 | 3.8 | 4.5 |
| Tens(2) | 5.1 | 5.3 | 4.7 | 4.6 | 4.4 |
| Tens(2)HA | 4.3 | 4.6 | 3.4 | 3.3 | 3.5 |
| Tear(1) | 45.8 | 50.8 | 46.2 | 42.2 | 45.9 |
| Tear(1)HA | 44.5 | 49.5 | 44.4 | 42.7 | 48.8 |
| Tear(2) | 19.6 | 20.2 | 18.8 | 17.7 | 20 |
| Tear(2)HA | 16.2 | 16.9 | 14.7 | 13.2 | 14.9 |
| FlexMod | 45.9 | 44.5 | 38.1 | 28.1 | 37.8 |
|  | 0% | −3% | −17% | −39% | −18% |
| FlexModHA | 34.6 | 31.3 | 25.0 | 21.3 | 20.6 |
| $T_g$ | −52.9 | −55.8 | −56.4 | −56.3 | −56.1 |
| $T_s$ | 67.5 | 64.1 | 63.2 | 53.8 | 56.6 |
|  | 0% | −5% | −6% | −20% | −16% |
| WaterAbs | 4.2 | 4.1 | 4.8 | 5.5 | 4.7 |

These tests show that the mechanical properties of the produced skin layers remain quite good when adding the flexibiliser P500 and when replacing at the same time a portion of the crosslinker amine-initiator DEOA by the extender amine-initiator DGA. Both P500 and DGA have a $T_s$ lowering effect. The lowering effect by the combination of P500 and DGA is larger than the sum of both effects, so that there appears to be a synergetic effect between P500 and DGA on the softening temperature $T_s$. Although the individual effect of MEA on $T_s$ has not been measured, it can be assumed that it will be in the same order of magnitude than the effect of DGA (since both involve the replacement of a portion of the crosslinker DEOA by a chain extender), so that there appears to be also a synergetic effect between P500 and MEA on the softening temperature $T_s$. In contrast to the softening temperature $T_s$, the glass transition temperature $T_g$ is nearly not affected by the addition of the flexibiliser, even not in combination with the extender amine-initiator DGA or MEA.

The flexural modulus is clearly reduced by the addition of the flexibiliser P500. Also the replacement of the crosslinker DEOA by the extender DGA results in a reduction of the flexural modulus, the combination of P500 and DGA resulting however in a much larger reduction indicating the occurrence of a synergetic effect between P500 and DGA on the flexural modulus of the skin layer. Such a synergetic effect was not proved to exist between P500 and the extender amine-initiator MEA. However, an additional reduction of the flexural modulus could be achieved by replacing a portion of DEOA with MEA while avoiding, or at least reducing, the negative effects which are obtained by increasing the P500 content of the reactive mixture.

The annexed FIGURE illustrates the storage modulus versus temperature graph 1, the loss modulus versus temperature graph 2 and the tan delta versus temperature graph 3 obtained by the DMA analysis of the reference example Ref 1 and the Example 1. At the glass transition temperature both the loss modulus and the tan delta graph show a peak whilst the storage modulus shows a sharp drop due to the increased mobility between the polymer chains, more particularly between the soft, polyether segments thereof. At the softening temperature $T_s$, no peak can be seen in the loss modulus graph nor a sharp drop in the storage modulus graph. However, the tan delta versus temperature graph shows a rather wide peak, the top of which is reached at the softening temperature. Notwithstanding the fact that the storage modulus shows no sharp drop at the softening temperature, it has been found that an important change in the physical bonds between the polymer chains must be achieved at the softening temperature since when heating the skin layer to a temperature equal to this softening temperature, or even to a somewhat lower temperature, more particularly a temperature which is 10, 20 or even 30° C. lower, creases formed in the skin layer can be removed therefrom quite easily.

TABLE 3

Formulations of reference example 2, comparative examples 3-4 and examples 3-4, all with a combination of a standard polyol and "green" polyols and with Bi/Sn catalysis.

|  | Ref 2 | Comp 3 | Comp 4 | Ex 3 | Ex 4 |
|---|---|---|---|---|---|
| Polyol blend | | | | | |
| Polyol 1 | 31 | 31 | 31 | 31 | 31 |
| NOP 1 | 15 | 15 | 15 | 15 | 15 |
| NOP 2 | 30 | 30 | 30 | 30 | 30 |
| DEOA | 5 | 4 | 5 | 4 | 4 |
| EG | 4 | 4 | 4 | 4 | 4 |
| DGA | | 1.5 | | 1.5 | |
| MEA | | | | | 1 |
| $f_{ai}$ | 3.0 | 2.73 | 3.0 | 2.73 | 2.8 |
| PA-Bi | 22.7 | 22.7 | 22.7 | 22.7 | 22.7 |
| Isocyanate blend | | | | | |
| ISO | 54.1 | 54.1 | 54.1 | 54.1 | 54.1 |
| P500 | | | 5 | 5 | 5 |
| IA-Sn | 1.2 | 1.2 | 1.2 | 1.2 | 1.2 |

TABLE 4

Properties of the skin layer obtained from the formulations of Table 3.

|  | Ref 2 | Comp 3 | Comp 4 | Ex 3 | Ex 4 |
|---|---|---|---|---|---|
| Density | 0.98 | 0.98 | 0.98 | 0.97 | 0.98 |
| Shore A | 80 | 79 | 77 | 72 | 73 |

TABLE 4-continued

Properties of the skin layer obtained
from the formulations of Table 3.

|  | Ref 2 | Comp 3 | Comp 4 | Ex 3 | Ex 4 |
|---|---|---|---|---|---|
| Reactivity | 21 | 23 | 27 | 29 | 24 |
| Elong(1) | 89 | 85 | 106 | 112 | 111 |
| Elong(1)HA | 54 | 72 | 94 | 96 | 107 |
| Elong(2) | 114 | 138 | 125 | 155 | 147 |
| Elong(2)HA | 89 | 134 | 137 | 159 | 183 |
| Tens(1) | 6.1 | 5.4 | 5.6 | 4.9 | 5.2 |
| Tens(1)HA | 4.2 | 4.5 | 3.6 | 3.6 | 3.7 |
| Tens(2) | 4.8 | 4.8 | 4.2 | 4.1 | 4.2 |
| Tens(2)HA | 3.5 | 3.9 | 2.9 | 2.8 | 3.0 |
| Tear(1) | 46.2 | 45.4 | 40.2 | 41.8 | 42.4 |
| Tear(1)HA | 39.8 | 42.9 | 38.5 | 37.3 | 37.4 |
| Tear(2) | 18.9 | 18.7 | 17.3 | 16.9 | 16.7 |
| Tear(2)HA | 17.2 | 18 | 14.7 | 13.9 | 14 |
| FlexMod | 43.0 | 37.5 | 31.9 | 18.4 | 26.5 |
|  | 0% | −13% | −26% | −57% | −38% |
| FlexModHA | 80.5 | 67.4 | 50.1 | 43.0 | 36.4 |
| $T_g$ | −46.8 | −50.2 | −52.5 | −51.1 | −47.7 |
| $T_s$ | 56.5 | 49.2 | 52.1 | 36.8 | 44.0 |
|  | 0% | −13% | −8% | −35% | −22% |
| WaterAbs | 2.9 | 2.8 | 3.3 | 3.0 | 3.5 |

In the "green" formulations, less DEOA was used since the "green" polyols result in a somewhat higher flexural modulus. This was compensated for by reducing the amount of DEOA. The tests show that similar effects are obtained by P500, DGA and MEA when using a polyurethane reactive mixture wherein a portion of the standard polyol has been replaced by a combination of NOP's (Natural Oil Polyols). A synergetic effect was more particularly observed for the combination of DGA and P500 and for the combination of MEA and P500 on the lowering of the softening temperature $T_s$.

The following examples will demonstrate the effect of an increased amount of DGA and a correspondingly reduced amount of DEOA on the softening temperature and the flexural modulus. The tests in tables 5 and 6 have been carried out with a Bi catalyst which is free of Sn.

TABLE 5

Formulations of reference example 3 and examples 5-9, all with
a standard polyol and with a Sn free Bi catalysis.

|  | Ref 3 | Ex 5 | Ex 6 | Ex 7 | Ex 8 | Ex 9 |
|---|---|---|---|---|---|---|
| Polyol blend | | | | | | |
| Polyol 1 | 76 | 76 | 76 | 76 | 76 | 76 |
| NOP 1 | | | | | | |
| NOP 2 | | | | | | |
| DEOA | 6 | 5 | 4 | 3 | 2 | 1 |
| EG | 4 | 4 | 4 | 4 | 4 | 4 |
| DGA |  | 1.5 | 3.0 | 4.5 | 6.0 | 7.5 |
| $F_{ai}$ | 3.0 | 2.77 | 2.57 | 2.4 | 2.25 | 2.11 |
| PA-Bi/A | 23.1 | 23.1 | 23.1 | 23.1 | 23.1 | 23.1 |
| Isocyanate blend | | | | | | |
| ISO | 54.1 | 54.1 | 54.1 | 54.1 | 54.1 | 54.1 |
| P500 |  | 5 | 5 | 5 | 5 | 5 |
| IA | 0.5 | 0.5 | 0.5 | 0.5 | 0.5 | 0.5 |

TABLE 6

Properties of the skin layer obtained from the formulations of Table 5.

|  | Ref 3 | Ex 5 | Ex 6 | Ex 7 | Ex 8 | Ex 9 |
|---|---|---|---|---|---|---|
| Reactivity | 22 | 23 | 17 | 19 | 18 | 18 |
| Elong(2) | 122 | 184 | 223 | 240 | 287 | 298 |
| Elong(2)HA | 215 | 323 | 342 | 351 | 349 | n.a. |
| Tens(2) | 5.3 | 4.7 | 4.7 | 4.5 | 4.2 | 3.9 |
| Tens(2)HA | 4.5 | 4.5 | 4.6 | 4.9 | 5.1 | n.a. |
| Tear(2) | 16.4 | 16.9 | 15.7 | 15.9 | 17.2 | 14.5 |
| Tear(2)HA | 14.8 | 14.8 | 15.6 | 15.8 | 15 | n.a. |
| FlexMod | 52.6 | 35.8 | 29.5 | 23.9 | 18.1 | 14.1 |
|  | 0% | −32% | −44% | −55% | −66% | −73% |
| FlexModHA | 19.1 | 15.4 | 14.2 | 13.3 | 15.4 | n.a. |
| $T_g$ | −58.4 | −58.9 | −57.6 | −59.6 | −57.4 | −58.2 |
| $T_s$ | 61.4 | 54.1 | 49.1 | 45.3 | 40.4 | 35.0 |
|  | 0% | −12% | −20% | −26% | −34% | −43% |

These tests show that the softening temperature $T_s$ and the flexural modulus can be decreased by replacing a larger portion of the crosslinker amine-initiator DEOA by the extender amine-initiator, in particular by DGA, whilst the elongation is increased. The mechanical properties such as tear resistance and tensile strength are surprisingly little affected in these tests. Compared to the results of the formulations in Tables 1 and 2, the combination of flexibiliser and DGA has apparently a somewhat smaller effect on the flexural modulus and the softening temperature in Sn free formulations than in formulations with Bi/Sn catalysis.

Similar effects have been obtained for the formulations wherein a portion of the standard polyol is replaced by the combination of "green" polyols. The results of these tests are given in the following tables 7 and 8.

TABLE 7

Formulations of reference example 4 and examples 10-
13, all with a combination of a standard polyol and
"green" polyols and with a Sn free Bi catalysis.

|  | Ref 4 | Ex 10 | Ex 11 | Ex 12 | Ex 13 |
|---|---|---|---|---|---|
| Polyol blend | | | | | |
| Polyol 1 | 31 | 31 | 31 | 31 | 31 |
| NOP 1 | 15 | 15 | 15 | 15 | 15 |
| NOP 2 | 30 | 30 | 30 | 30 | 30 |
| DEOA | 5 | 4 | 3 | 2 | 1 |
| EG | 4 | 4 | 4 | 4 | 4 |
| DGA |  | 1.5 | 3.0 | 4.5 | 6.0 |
| $f_{ai}$ | 3.0 | 2.73 | 2.5 | 2.31 | 2.14 |
| PA-Bi/A | 23.1 | 23.1 | 23.1 | 23.1 | 23.1 |
| Isocyanate blend | | | | | |
| ISO | 54.1 | 54.1 | 54.1 | 54.1 | 54.1 |
| P500 |  | 5 | 5 | 5 | 5 |
| IA | 0.5 | 0.5 | 0.5 | 0.5 | 0.5 |

TABLE 8

Properties of the skin layer obtained
from the formulations of Table 7.

|  | Ref 4 | Ex 10 | Ex 11 | Ex 12 | Ex 13 |
|---|---|---|---|---|---|
| Reactivity | 27 | 25 | 25 | 25 | 28 |
| Elong(2) | 115 | 159 | 163 | 177 | 254 |
| Elong(2)HA | 206 | 240 | 269 | 278 | 312 |
| Tens(2) | 4.9 | 4.2 | 3.9 | 3.5 | 4.0 |
| Tens(2)HA | 4.1 | 3.9 | 3.9 | 3.7 | 4.1 |
| Tear(2) | 16.6 | 14.9 | 15.4 | 13.6 | 14.1 |
| Tear(2)HA | 16.0 | 14.4 | 14.5 | 15.4 | 17.2 |
| FlexMod | 47.1 | 23.9 | 21.2 | 16.8 | 15.7 |
|  | 0% | −49% | −55% | −64% | −67% |

TABLE 8-continued

Properties of the skin layer obtained from the formulations of Table 7.

|  | Ref 4 | Ex 10 | Ex 11 | Ex 12 | Ex 13 |
|---|---|---|---|---|---|
| FlexModHA | 33 | 23.5 | 22.8 | 21.2 | 23.7 |
| $T_g$ | −50.7 | −49.7 | −49.4 | −48.4 | −46.6 |
| $T_s$ | 55.6 | 39.1 | 36.6 | 31.2 | 23.9 |
|  | 0% | −30% | −34% | −44% | −57% |

In the following examples, the effect of extender amine-initators of formula (I), other than DGA and MEA, have been demonstrated in formulations which are Sn free and which contain either a standard polyol (Tables 9 and 10) or a combination of a standard polyol with "green" polyols (Tables 11 and 12).

TABLE 9

Formulations of reference example 4 and examples 14-19, all with a standard polyol and with a Sn free Bi catalysis.

|  | Ref 4 | Ex 14 | Ex 15 | Ex 16 | Ex 17 | Ex 18 | Ex 19 |
|---|---|---|---|---|---|---|---|
| Polyol blend | | | | | | | |
| Polyol 1 | 76 | 76 | 76 | 76 | 76 | 76 | 76 |
| NOP 1 | | | | | | | |
| NOP 2 | | | | | | | |
| DEOA | 6 | 5 | 5 | 5 | 5 | 5 | 5 |
| EG | 4 | 4 | 4 | 4 | 4 | 4 | 4 |
| DGA | | 1.5 | | | | | |
| IPA | | | 1.0 | | | | |
| 3-APROP | | | | 1.0 | | | |
| 5-APENT | | | | | 1.5 | | |
| AMP | | | | | | 1.3 | |
| 2-A-BUT | | | | | | | 1.3 |
| $f_{ai}$ | 3.0 | 2.77 | 2.83 | 2.83 | 2.77 | 2.79 | 2.79 |
| PA-Bi/A | 23.1 | 23.1 | 23.1 | 23.1 | 23.1 | 23.1 | 23.1 |
| Isocyanate blend | | | | | | | |
| ISO | 54.1 | 54.1 | 54.1 | 54.1 | 54.1 | 54.1 | 54.1 |
| P500 | | 5 | 5 | 5 | 5 | 5 | 5 |
| IA | 0.5 | 0.5 | 0.5 | 0.5 | 0.5 | 0.5 | 0.5 |

TABLE 10

Properties of the skin layer obtained from the formulations of Table 9.

|  | Ref 4 | Ex 14 | Ex 15 | Ex 16 | Ex 17 | Ex 18 | Ex 19 |
|---|---|---|---|---|---|---|---|
| Reactivity | 20 | 20 | 20 | 22 | 22 | 22 | 19 |
| Elong(2) | 142 | 159 | 157 | 164 | 176 | 181 | 160 |
| Elong(2)HA | 227 | 295 | 275 | 284 | 264 | 331 | 298 |
| Tens(2) | 5.5 | 4.9 | 5.0 | 4.5 | 4.5 | 4.3 | 4.8 |
| Tens(2)HA | 5.2 | 4.5 | 4.3 | 4.4 | 4.4 | 4.1 | 4.6 |
| Tear(2) | 18.7 | 18.0 | 18.3 | 16.7 | 16.9 | 17.7 | 17.5 |
| Tear(2)HA | 15.3 | 14.9 | 14.8 | 15.1 | 14.1 | 14.1 | 15.6 |
| FlexMod | 50.4 | 43.1 | 41.2 | 35.7 | 34.5 | 42.2 | 54.5 |
|  | 0% | −14% | −18% | −29% | −32% | −16% | +8% |
| FlexModHA | 33.2 | 25.9 | 26.8 | 23.8 | 23.4 | 20.5 | 25.1 |
| $T_g$ | −54.7 | −56.7 | −55.1 | −56.0 | −55.6 | −56.4 | −56.0 |
| $T_s$ | 60.4 | 52.1 | 54.9 | 51.8 | 51.5 | 52.5 | 51.6 |
|  | 0% | −14% | −9% | −14% | −15% | −13% | −15% |

TABLE 11

Formulations of reference example 5 and examples 20-25, all with a combination of a standard polyol with "green" polyols and with a Sn free Bi catalysis.

|  | Ref 5 | Ex 20 | Ex 21 | Ex 22 | Ex 23 | Ex 24 | Ex 25 |
|---|---|---|---|---|---|---|---|
| Polyol blend | | | | | | | |
| Polyol 1 | 31 | 31 | 31 | 31 | 31 | 31 | 31 |
| NOP 1 | 15 | 15 | 15 | 15 | 15 | 15 | 15 |
| NOP 2 | 30 | 30 | 30 | 30 | 30 | 30 | 30 |
| DEOA | 5 | 4 | 4 | 4 | 4 | 4 | 4 |
| EG | 4 | 4 | 4 | 4 | 4 | 4 | 4 |
| DGA | | 1.5 | | | | | |
| IPA | | | 1.0 | | | | |
| 3-APROP | | | | 1.0 | | | |
| 5-APENT | | | | | 1.5 | | |
| AMP | | | | | | 1.3 | |
| 2-A-BUT | | | | | | | 1.3 |
| $f_{ai}$ | 3.0 | 2.73 | 2.8 | 2.8 | 2.73 | 2.75 | 2.75 |
| PA-Bi/A | 23.1 | 23.1 | 23.1 | 23.1 | 23.1 | 23.1 | 23.1 |
| Isocyanate blend | | | | | | | |
| ISO | 54.1 | 54.1 | 54.1 | 54.1 | 54.1 | 54.1 | 54.1 |
| P500 | | 5 | 5 | 5 | 5 | 5 | 5 |
| IA | 0.5 | 0.5 | 0.5 | 0.5 | 0.5 | 0.5 | 0.5 |

TABLE 12

Properties of the skin layer obtained from the formulations of Table 11.

|  | Ref 5 | Ex 20 | Ex 21 | Ex 22 | Ex 23 | Ex 24 | Ex 25 |
|---|---|---|---|---|---|---|---|
| Reactivity | 26 | 27 | 29 | 28 | 28 | 29 | 26 |
| Elong(2) | 116 | 164 | 143 | 139 | 142 | 167 | 144 |
| Elong(2)HA | 183 | 224 | 227 | 210 | 217 | 253 | 206 |
| Tens(2) | 4.7 | 4.0 | 4.2 | 3.8 | 3.8 | 4.0 | 4.2 |
| Tens(2)HA | 4.2 | 3.9 | 3.9 | 3.9 | 4.0 | 3.4 | 3.7 |
| Tear(2) | 16.1 | 14.2 | 15.6 | 14.8 | 14.1 | 14.4 | 16.1 |
| Tear(2)HA | 19.3 | 14.4 | 15.5 | 14.8 | 15.2 | 15.7 | 14.2 |
| FlexMod | 44.2 | 22.7 | 30.0 | 23.8 | 22.9 | 26.9 | 30.5 |
|  | 0% | −49% | −32% | −46% | −48% | −39% | −31% |
| FlexMod HA | 45.3 | 35.0 | 37.5 | 39.6 | 41.4 | 27.5 | 45.7 |
| $T_g$ | −49.6 | −50.1 | −49.3 | −49.7 | −48.4 | −48.2 | −52.6 |
| $T_s$ | 50.4 | 33.2 | 31.4 | 35.6 | 27.6 | 30.4 | 41.4 |
|  | 0% | −34% | −38% | −29% | −45% | −40% | −18% |

The results given in Tables 10 and 12 demonstrate that also the other extender amine-initiators IPA, 3-APROP, 5-APENT, AMP and 2-A-BUT have a substantial effect on the softening temperature and the flexural modulus while maintaining the other desired mechanical properties.

The following examples demonstrate that these advantageous effects on the flexural modulus and on the softening temperature are also obtained for polyurethane formulations containing a Bi/Sn catalyst, and this both for standard formulations and "green" formulations (containing a combination of a standard polyol and "green" polyols).

TABLE 13

Formulations of reference example 6 and examples 26-31, all with a standard polyol and a Sn/Bi catalysis.

|  | Ref 6 | Ex 26 | Ex 27 | Ex 28 | Ex 29 | Ex 30 | Ex 31 |
|---|---|---|---|---|---|---|---|
| Polyol blend | | | | | | | |
| Polyol 1 | 76 | 76 | 76 | 76 | 76 | 76 | 76 |
| NOP 1 | | | | | | | |
| NOP 2 | | | | | | | |
| DEOA | 6 | 5 | 5 | 5 | 5 | 5 | 5 |
| EG | 4 | 4 | 4 | 4 | 4 | 4 | 4 |
| DGA | | 1.5 | | | | | |

TABLE 13-continued

Formulations of reference example 6 and examples 26-31, all with a standard polyol and a Sn/Bi catalysis.

|  | Ref 6 | Ex 26 | Ex 27 | Ex 28 | Ex 29 | Ex 30 | Ex 31 |
|---|---|---|---|---|---|---|---|
| IPA |  | 1.0 |  |  |  |  |  |
| 3-APROP |  |  | 1.0 |  |  |  |  |
| 5-APENT |  |  |  | 1.5 |  |  |  |
| AMP |  |  |  |  |  | 1.3 |  |
| 2-A-BUT |  |  |  |  |  |  | 1.3 |
| $f_{ai}$ | 3.0 | 2.77 | 2.83 | 2.83 | 2.77 | 2.79 | 2.79 |
| PA-Bi | 22.7 | 22.7 | 22.7 | 22.7 | 22.7 | 22.7 | 22.7 |
| Isocyanate blend | | | | | | | |
| ISO | 54.1 | 54.1 | 54.1 | 54.1 | 54.1 | 54.1 | 54.1 |
| P500 |  | 5 | 5 | 5 | 5 | 5 | 5 |
| IA-Sn | 1.2 | 1.2 | 1.2 | 1.2 | 1.2 | 1.2 | 1.2 |

TABLE 14

Properties of the skin layer obtained from the formulations of Table 13.

|  | Ref 6 | Ex 26 | Ex 27 | Ex 28 | Ex 29 | Ex 30 | Ex 31 |
|---|---|---|---|---|---|---|---|
| Reactivity | 21 | 21 | 22 | 21 | 21 | 22 | 20 |
| Elong(2) | 135 | 159 | 179 | 171 | 169 | 149 | 153 |
| Elong(2)HA | 155 | 200 | 200 | 196 | 201 | 206 | 190 |
| Tens(2) | 6.3 | 4.7 | 5.2 | 4.9 | 4.8 | 5.0 | 5.2 |
| Tens(2)HA | 4.9 | 4.0 | 4.1 | 4.1 | 4.2 | 4.3 | 3.9 |
| Tear(2) | 20.2 | 20.6 | 21.2 | 18.7 | 19.4 | 21.7 | 20.3 |
| Tear(2)HA | 18.3 | 14.7 | 14.2 | 15.2 | 14.2 | 14.3 | 14.6 |
| FlexMod | 77.5 | 48.3 | 64 | 55.2 | 50.6 | 64.4 | 63.5 |
|  | 0% | −38% | −17% | −29% | −35% | −17% | −18% |
| FlexModHA | 33.8 | 23.7 | 21.9 | 29.5 | 22.8 | 22.2 | 21.4 |
| $T_g$ | −52.8 | −53.4 | −54.7 | −54.2 | −54.8 | −52.4 | −55.1 |
| $T_s$ | 74.2 | 63.6 | 65.7(*) | 62.5 | 63.6 | 67.8(*) | 64.2 |
|  |  | −14% | −11% | −16% | −14% | −9% | −14% |

(*)These $T_s$ values are higher than 65° C. so that Examples 27 and 30 are not in accordance with the invention. The $T_s$ values of these examples can however be lowered by increasing the amount of flexibiliser and/or of extender amine-initiator.

TABLE 15

Formulations of reference example 7 and examples 32-37, all with a combination of a standard polyol with "green" polyols and with a Bi/Sn catalysis.

|  | Ref 7 | Ex 32 | Ex 33 | Ex 34 | Ex 35 | Ex 36 | Ex 37 |
|---|---|---|---|---|---|---|---|
| Polyol blend | | | | | | | |
| Polyol 1 | 31 | 31 | 31 | 31 | 31 | 31 | 31 |
| NOP 1 | 15 | 15 | 15 | 15 | 15 | 15 | 15 |
| NOP 2 | 30 | 30 | 30 | 30 | 30 | 30 | 30 |
| DEOA | 5 | 4 | 4 | 4 | 4 | 4 | 4 |
| EG | 4 | 4 | 4 | 4 | 4 | 4 | 4 |
| DGA |  | 1.5 |  |  |  |  |  |
| IPA |  |  | 1.0 |  |  |  |  |
| 3-APROP |  |  |  | 1.0 |  |  |  |
| 5-APENT |  |  |  |  | 1.5 |  |  |
| AMP |  |  |  |  |  | 1.3 |  |
| 2-A-BUT |  |  |  |  |  |  | 1.3 |
| $f_{ai}$ | 3.0 | 2.73 | 2.8 | 2.8 | 2.73 | 2.75 | 2.75 |
| PA-Bi | 22.7 | 22.7 | 22.7 | 22.7 | 22.7 | 22.7 | 22.7 |
| Isocyanate blend | | | | | | | |
| ISO | 54.1 | 54.1 | 54.1 | 54.1 | 54.1 | 54.1 | 54.1 |
| P500 |  | 5 | 5 | 5 | 5 | 5 | 5 |
| IA-Sn | 1.2 | 1.2 | 1.2 | 1.2 | 1.2 | 1.2 | 1.2 |

TABLE 16

Properties of the skin layer obtained from the formulations of Table 15.

|  | Ref 7 | Ex 32 | Ex 33 | Ex 34 | Ex 35 | Ex 36 | Ex 37 |
|---|---|---|---|---|---|---|---|
| Reactivity | 41 | 28 | 28 | 26 | 28 | 27 | — |
| Elong(2) | 62 | 71 | 79 | 83 | 76 | 85 | 83 |
| Elong(2)HA | 57 | 87 | 66 | 59 | 60 | 89 | 62 |
| Tens(2) | 3.7 | 2.7 | 3.4 | 3.5 | 3.2 | 4.1 | 4.1 |
| Tens(2)HA | 3.5 | 3.1 | 3.0 | 3.1 | 3.1 | 3.3 | 2.9 |
| Tear(2) | 19.6 | 15.0 | 17.5 | 17.9 | 17.8 | 18.3 | 16.3 |
| Tear(2)HA | 16.9 | 12.7 | 14.7 | 15.0 | 15.3 | 14.6 | 13.0 |
| FlexMod | 53.5 | 23.2 | 40.0 | 35.7 | 33.7 | 43.0 | 37.7 |
|  | 0% | −57% | −25% | −33% | −37% | −20% | −30% |
| FlexModHA | 78.3 | 55.8 | 60.2 | 69.8 | 77.4 | 58.3 | 67.8 |
| $T_g$ | −46.9 | −46.3 | −48.1 | −49.7 | −47.9 | −49.2 | −47.8 |
| $T_s$ | 61.6 | 31.2 | 50.6 | 48.2 | 43.2 | 54.2 | 55.2 |
|  |  | −49% | −18% | −22% | −30% | −12% | −10% |

The results given in Tables 14 and 16 demonstrate that also in the case of Bi/Sn catalysis the other extender amine-initiators IPA, 3-APROP, 5-APENT, AMP and 2-A-BUT have a substantial lowering effect on the softening temperature and the flexural modulus while maintaining the other desired mechanical properties.

In the following examples, the effect of the molecular weight of the flexibiliser (P350, P500 and P750) and the concentration variation of P500, have been demonstrated in formulations catalyzed with Bi/Sn catalysis and which contain either a standard polyol (Tables 17 and 18) or a combination of a standard polyol with "green" polyols (Tables 19 and 20).

TABLE 17

Formulations of reference example 8 and examples 38-43, all with a standard polyol and a Sn/Bi catalysis.

|  | Ref 8 | Ex 38 | Ex 39 | Ex 40 | Ex 41 | Ex 42 | Ex 43 |
|---|---|---|---|---|---|---|---|
| Polyol blend | | | | | | | |
| Polyol 1 | 76 | 76 | 76 | 76 | 76 | 76 | 76 |
| NOP 1 | | | | | | | |
| NOP 2 | | | | | | | |
| DEOA | 6 | 5 | 5 | 5 | 5 | 5 | 5 |
| EG | 4 | 4 | 4 | 4 | 4 | 4 | 4 |
| DGA |  | 1.5 | 1.5 | 1.5 | 1.5 | 1.5 | 1.5 |
| $f_{ai}$ | 3.0 | 2.77 | 2.77 | 2.77 | 2.77 | 2.77 | 2.77 |
| PA-Bi | 22.7 | 22.7 | 22.7 | 22.7 | 22.7 | 22.7 | 22.7 |
| Isocyanate blend | | | | | | | |
| ISO | 54.1 | 54.1 | 54.1 | 54.1 | 54.1 | 54.1 | 54.1 |
| P350 |  | 5 |  |  |  |  |  |
| P500 |  |  |  | 1 | 3 | 5 | 7 |
| P750 |  |  | 5 |  |  |  |  |
| IA-Sn | 1.2 | 1.2 | 1.2 | 1.2 | 1.2 | 1.2 | 1.2 |

TABLE 18

Properties of the skin layer obtained from the formulations of Table 17.

|  | Ref 8 | Ex 38 | Ex 39 | Ex 40 | Ex 41 | Ex 42 | Ex 43 |
|---|---|---|---|---|---|---|---|
| Density | 1.01 | 1.00 | 0.96 | 1.01 | 0.99 | 0.85 | 0.98 |
| Shore A | 81 | 71 | 73 | 78 | 74 | 71 | 71 |
| Reactivity | 23 | 28 | 25 | 25 | 26 | 29 | 30 |
| Elong(2) | 116 | 161 | 141 | 125 | 120 | 129 | 155 |
| Elong(2)HA | 175 | 186 | 174 | 152 | 162 | 153 | 173 |
| Tens(2) | 5.4 | 4.2 | 4.0 | 4.5 | 4.1 | 3.7 | 3.8 |
| Tens(2)HA | 4.1 | 3.7 | 3.4 | 3.7 | 3.5 | 2.7 | 2.9 |
| Tear(2) | 18.9 | 16.6 | 16.0 | 17.1 | 16.2 | 15.6 | 14.7 |
| Tear(2)HA | 14.7 | 14.4 | 13.9 | 15.3 | 13.5 | 10.8 | 11.8 |
| FlexMod | 55.4 | 31.6 | 34.5 | 44.4 | 42.0 | 30.2 | 26.4 |
|  |  | −43% | −38% | −20% | −24% | −45% | −52% |
| FlexModHA | 26.9 | 22.4 | 17.8 | 23.8 | 22.2 | 14.1 | 15.7 |
| $T_g$ | −54.4 | −55.9 | −57.5 | −54.6 | −57.3 | −55.2 | −56.3 |
| $T_s$ | 74.5 | 62.5 | 64.2 | 70.4(*) | 66.9(*) | 62.6 | 56.1 |
|  |  | −16% | −14% | −6% | −10% | −16% | −25% |

(*)These $T_s$ values are higher than 65° C. so that Examples 40 and 41 are not in accordance with the invention. The $T_s$ values of these examples can however be lowered by increasing the amount of flexibiliser (see Examples 42 and 43) and/or of extender amine-initiator.

The values in Table 18 show that the decrease in flexural modulus and softening temperature Ts, are in the same order of magnitude by using a same amount of flexibiliser of different molecular weight (P350, P500 and P750), in combination with a constant DGA concentration. This observation can be explained by the double action of the flexibiliser: chain stopper in the polyurethane reaction and introducing flexibility through the dangling chain end. Using a lower molecular weight flexibiliser (P350) implies that more isocyanate is consumed in the polyurethane reaction. The chain stop effect will thus be higher then the flexibilising effect of the shorter dangling chain end. Using a higher molecular weight flexibiliser (P750) implies less isocyanate consumption in the polyurethane reaction. The chain stop effect will then be lower than the flexibilising effect of the longer dangling chain end. Both effect are compensating each other. The same holds true for the use of P500. The latter is the best compromise in terms of isocyanate consumption (cost benefit) and process ability.

Furthermore increasing the P500 concentration from 1 to 7 parts clearly shows a gradual decrease in flexural modulus and softening temperature Ts. The mechanical properties of Ex 42 (5 parts P500) tend to be somewhat lower, but this is due to the somewhat lower density compared to the other examples.

TABLE 19

Formulations of reference example 9 and examples 44-49, all with a combination of a standard polyol with "green" polyols and with a Bi/Sn catalysis.

|  | Ref 9 | Ex 44 | Ex 45 | Ex 46 | Ex 47 | Ex 48 | Ex 49 |
|---|---|---|---|---|---|---|---|
| Polyol blend | | | | | | | |
| Polyol 1 | 31 | 31 | 31 | 31 | 31 | 31 | 31 |
| NOP 1 | 15 | 15 | 15 | 15 | 15 | 15 | 15 |
| NOP 2 | 30 | 30 | 30 | 30 | 30 | 30 | 30 |
| DEOA | 5 | 4 | 4 | 4 | 4 | 4 | 4 |
| EG | 4 | 4 | 4 | 4 | 4 | 4 | 4 |
| DGA |  | 1.5 | 1.5 | 1.5 | 1.5 | 1.5 | 1.5 |
| $f_{ai}$ | 3.0 | 2.73 | 2.73 | 2.73 | 2.73 | 2.73 | 2.73 |
| PA-Bi | 22.7 | 22.7 | 22.7 | 22.7 | 22.7 | 22.7 | 22.7 |
| Isocyanate blend | | | | | | | |
| ISO | 54.1 | 54.1 | 54.1 | 54.1 | 54.1 | 54.1 | 54.1 |
| P350 |  | 5 |  |  |  |  |  |
| P500 |  |  |  | 1 | 3 | 5 | 7 |
| P750 |  |  | 5 |  |  |  |  |
| IA-Sn | 1.2 | 1.2 | 1.2 | 1.2 | 1.2 | 1.2 | 1.2 |

TABLE 20

Properties of the skin layer obtained from the formulations of Table 19.

|  | Ref 9 | Ex 44 | Ex 45 | Ex 46 | Ex 47 | Ex 48 | Ex 49 |
|---|---|---|---|---|---|---|---|
| Density | 0.94 | 0.93 | 0.95 | 0.95 | 0.71 | 0.71 | 0.92 |
| Shore A | 74 | 66 | 67 | 73 | 68 | 66 | 64 |
| Reactivity | 31 | 34 | 32 | 37 | 39 | 38 | 43 |
| Elong(2) | 116 | 160 | 151 | 144 | 168 | 174 | 185 |
| Elong(2)HA | 92 | 98 | 98 | 89 | 88 | 97 | 115 |
| Tens(2) | 3.9 | 3.2 | 3.3 | 3.9 | 3.4 | 3.6 | 3.1 |
| Tens(2)HA | 3.4 | 3.1 | 2.8 | 3.4 | 3.1 | 2.9 | 2.6 |
| Tear(2) | 15.9 | 13.9 | 13.0 | 15.4 | 13.3 | 12.2 | 12.8 |
| Tear(2)HA | 15.0 | 14.9 | 13.1 | 16.0 | 13.6 | 13.6 | 12.4 |
| FlexMod | 41.2 | 20.1 | 19.7 | 31.8 | 22.1 | 17.0 | 16.0 |
|  |  | −51% | −52% | −23% | −46% | −59% | −61% |
| FlexModHA | 52.8 | 44.8 | 38.9 | 51.1 | 46.5 | 40.8 | 33.1 |
| $T_g$ | −49.7 | −51.1 | −49.5 | −50.9 | −54.3 | −55.4 | −54.2 |
| $T_s$ | 65.5 | 47.2 | 46.0 | 60.1 | 53.1 | 43.5 | 45.8 |
|  |  | −28% | −30% | −8% | −19% | −34% | −30% |

As can be seen from the results in Table 20, the trends as observed for the formulations made in Table 17 with standard polyol, are as well observed for the corresponding formulations made with a combination of a standard polyol and 'green' polyols and made with Bi/Sn catalysis. The decrease in flexural modulus and softening temperature Ts are comparable, independent on the molecular weight of the flexibiliser. Increasing the amount of P500 from 1 to 7 parts shows a decreasing trend in flexural modulus and softening temperature Ts.

The invention claimed is:

1. A method for producing a layer of a flexible, elastomeric, thermoset, phase-separated polyurethane material which has an average density higher than 400 kg/m$^3$, in which method the polyurethane material of the layer is prepared by reacting a reactive mixture which is made of compounds comprising:
   A) one or more isocyanate compounds comprising IPDI (isophoronediisocyanate) timers;
   B) isocyanate-reactive compounds comprising:
   b1) one or more active hydrogen containing compounds having: functional groups comprising hydroxyl, amine and/or thiol groups;
   a nominal functionality of from 2 to 4; and
   an equivalent weight of between 200 and 4000;
   b2) one or more flexibilisers which have a molecular weight between 200 and 1500 and which contain only one isocyanate-reactive group which will react with an isocyanate group of said isocyanate compounds;
   b3) 1 to 30 parts by weight, per 100 parts by weight of said isocyanate-reactive compounds B, of one or more chain-extenders and/or crosslinkers having only hydroxyl groups as functional groups, at least 50% of which are primary hydroxyl groups, an equivalent weight smaller than 200 and a functionality from 2 to 6; and
   b4) a combination of one or more crosslinking amine-initiators with one or more extender amine-initiators, each of which have a functionality of 2 to 6 and an equivalent weight lower or equal to 200 and which comprise at least one aliphatic or alicyclic NH$_2$— or NH— group, said crosslinking amine-initiators comprising one or more crosslinking amine-initiators which have a functionality of at least 3; and
   C) one or more catalysts,
   characterised in that the polyurethane material has a softening temperature which is lower than 65° C. and said extender amine-initiators comprise one or more extender amine-initiators which have a functionality of 2 and a molecular weight of less than 300 and which correspond to formula (I):

HR$^1$N—R$^2$—OH    (I)

wherein:
   R$^1$ is H or a cyclic or acyclic hydrocarbon chain, which is substituted or not and which comprises one or more hetero-atoms or not; and
   R$^2$ is a cyclic or acyclic hydrocarbon chain which is substituted or not, which comprises one or more hetero-atoms or not and which comprises a backbone linking the amino group with the hydroxyl group and containing at least two carbon atoms,
   and in that the ratio between the amount of said extender amine-initiators and the amount of said crosslinking amine-initiators is such that the polyurethane material has a softening temperature which is lower than 65° C.,
   and in that said isocyanate-reactive compounds B comprise, per 100 parts by weight thereof, from 3 to less than 8 parts by weight of said crosslinking amine-initiators, and from 3 to less than 15 parts by weight of said flexibilisers,
   and in that at least one of said flexibilisers contains a polyether chain comprising ethylene oxide, propylene oxide or tetramethylene oxide units, or a mixture of two or more of these units in a mixed, blocked or random sequence.

2. A method according to claim 1, characterised in that said chain-extenders and/or crosslinkers (b3) have a number average functionality which is equal to or larger than 2 and smaller than 2.5.

3. A method according to claim 1, characterised in that said extender amine-initiators comprise an α,ω-aminohydroxy(alkylene oxide)$_n$, n being from 2 to 7, and/or an aminoalcohol.

4. A method according to claim 1, characterised in that at least one of said flexibilisers comprise a monoalkylether of polyethylene glycol, polypropylene glycol or poly(tetramethylene ether) glycol.

5. A method according to claim 1, characterised in that at least one of said extender amine-initiators corresponds to formula (I) wherein R$^1$ is H.

6. A method according to claim 1, characterised in that the functionality of said isocyanate compounds and of said isocyanate-reactive compounds and the relative amounts of these compounds are selected so that the average molecular weight per crosslink (M$_c$) of the produced polyurethane material is less than 4000, but larger than 700.

7. A method according to claim 1, characterised in that said active hydrogen containing compounds comprise at least one compound derived from a renewable source.

8. A method according to claim 1, characterised in that the polyurethane material has a softening temperature which is lower than 60° C.

9. A method according to claim 1, characterised in that said chain-extenders and/or crosslinkers (b3) have a number average functionality which is equal to or larger than 2 and smaller than 2.3.

10. A method according to claim 1, characterised in that said chain-extenders and/or crosslinkers (b3) have a number average functionality which is equal to or larger than 2 and smaller than 2.1.

11. A layer obtained by the method according to claim 1, which layer is made of a flexible, elastomeric, thermoset, phase-separated polyurethane material which has an average density higher than 400 kg/m$^3$, characterised in that the polyurethane material has a softening temperature which is lower than 65° C.

12. A method for using a layer according to claim 11 for manufacturing a self-supporting part containing the layer united with a rigid substrate layer, characterised in that during uniting and/or before and/or after having united the layer with the rigid substrate layer said layer is heated to a temperature which is higher than the softening temperature minus 30° C., so that creases which may have been formed in the layer are at least partially removed.